United States Patent [19]

Steeby

[11] Patent Number: 5,441,463
[45] Date of Patent: Aug. 15, 1995

[54] SELECTED SPEED RATIO NOT-ENGAGED RANGE SECTION RECOVERY BY SHIFTING TO A NON-SELECTED SPEED RATIO AND IF PERMITTED, SHIFTING TO THE SELECTED SPEED RATIO

[75] Inventor: Jon A. Steeby, Schoolcraft, Mich.

[73] Assignee: Eaton Corporation, Cleveland, Ohio

[21] Appl. No.: 142,033

[22] Filed: Oct. 28, 1993

[51] Int. Cl.⁶ .................................. F16H 61/16
[52] U.S. Cl. ........................ 477/79; 477/80; 74/336 R
[58] Field of Search .......... 477/70, 86, 123, 79, 477/80; 74/335, 336 R

[56] References Cited

U.S. PATENT DOCUMENTS

| | | | |
|---|---|---|---|
| 4,648,290 | 3/1987 | Dunkley et al. | 477/70 X |
| 4,896,267 | 11/1990 | Douglas et al. | 364/426.04 |
| 5,063,511 | 11/1991 | Mack et al. | 364/424.1 |
| 5,099,711 | 3/1992 | Langbo et al. | 74/335 X |
| 5,117,710 | 6/1992 | Asano et al. | 74/336 R |
| 5,261,288 | 11/1993 | Menig | 74/335 |
| 5,353,662 | 10/1994 | Vaughters | 74/335 X |

FOREIGN PATENT DOCUMENTS

| | | |
|---|---|---|
| 0350476 | 1/1990 | European Pat. Off. |
| 364220 | 4/1990 | European Pat. Off. |
| 413412 | 2/1991 | European Pat. Off. |
| 0517421 | 12/1992 | European Pat. Off. |

Primary Examiner—Charles A. Marmor
Assistant Examiner—Khoi Q. Ta
Attorney, Agent, or Firm—Howard D. Gordon

[57] ABSTRACT

A control system for sensing unintended range section (14) not-engaged conditions in an automated mechanical range-type compound transmission (10), and for causing engagement of the selected range section ratio (86, 88), is provided.

9 Claims, 4 Drawing Sheets

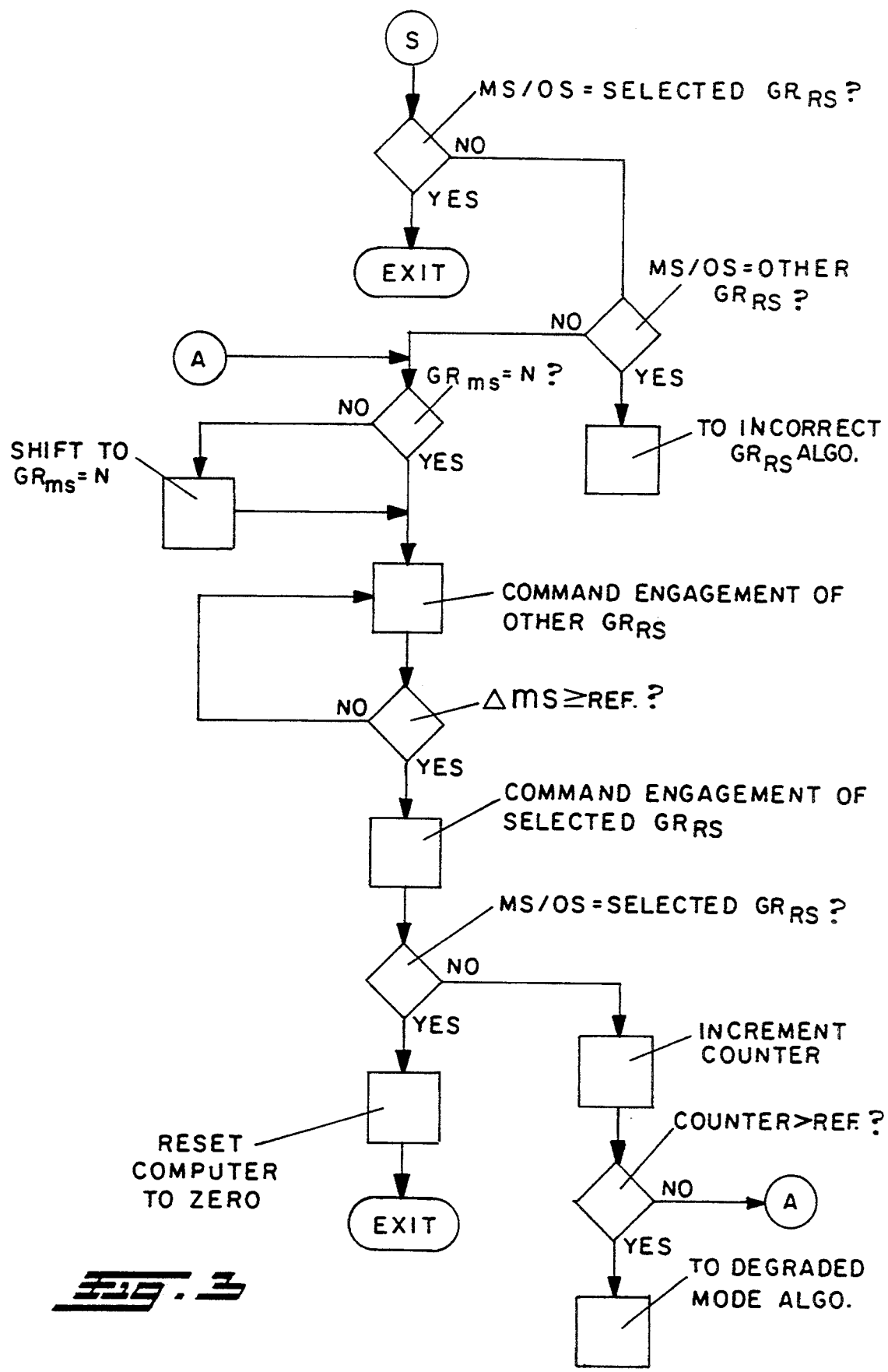

SELECTED SPEED RATIO NOT-ENGAGED RANGE SECTION RECOVERY BY SHIFTING TO A NON-SELECTED SPEED RATIO AND IF PERMITTED, SHIFTING TO THE SELECTED SPEED RATIO

BACKGROUND OF THE INVENTION

Related Applications

This application is related to U.S. patent application Ser. No. 08/155,314, titled FORCED ENGAGEMENT LOGIC, filed Sep. 22, 1993, now U.S. Pat. No. 5,429,559 and assigned to the same assignee, Eaton Corporation, as this application.

Field of the Invention

This invention relates to vehicular automatic or partially automatic compound mechanical transmission systems having a main section and an auxiliary section connected in series therewith and, in particular, to automated compound mechanical transmission systems of the range type wherein two selectable range ratios are engaged by a double-acting synchronized jaw clutch.

More particularly, the present invention relates to a control system/method which enhances recovery from unintended non-engagement conditions in the synchronized range section of an automated mechanical compound range-type transmission.

Description of the Prior Art

Fully automatic transmission systems, both for heavy-duty vehicles such as heavy-duty trucks, and for automobiles, that sense throttle openings or positions, vehicle speeds, engine speeds, transmission shaft speeds and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065 and 4,361,060, the disclosures of which are incorporated herein by reference.

Semi-automatic transmission systems utilizing electronic control units which sense throttle position, engine, input shaft, main shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

Semi-automatic shift implementation systems/methods for mechanical transmission systems for use in vehicles having a manually only controlled engine throttle means and/or a manually only controlled master clutch, have been proposed. Such systems may be seen by reference to U.S. Pat. Nos. 5,053,959; 5,053,961; 5,053,962; 5,063,511; 5,050,079; 5,081,588; 5,089,962 and 5,105,357, the disclosures of which are incorporated herein by reference.

For heavy duty vehicles, such as trucks and tractor/semi-trailer vehicles, compound fully or partially automated transmissions comprising a main section connected in series with a range, splitter or combined range and splitter auxiliary section, are typically utilized to provide the required 9, 10, 12, 13, 16, 18 or more forward speed ratios. Typically, the range auxiliary sections utilize a two-sided double-acting synchronized jaw clutch assembly to engage a selected one of the two selectable range section ratios.

In an automated compound mechanical transmission, especially an automated compound transmission of the range type or the combined splitter and range type, it is important to provide a procedure for engaging or reengaging the selected range ratio, while avoiding crash-through shifts, upon sensing that range section did not complete engagement or has come out of engagement (i.e., upon sensing an unintended, not-engaged range section condition).

SUMMARY OF THE INVENTION

In accordance with the present invention, an engagement strategy for recovery from a non-intended, not-engaged range section condition is provided which will provide for engagement of the currently selected range section ratio in a manner minimizing the likelihood of hanging up on or crashing through the range section jaw clutch synchronizer blocking members.

As is known, in a compound transmission, the overall ratio between input shaft and output shaft speeds is determined by the currently engaged main section ratio and the currently engaged auxiliary section ratio(s). In a compound transmission having a rear auxiliary section, by sensing output shaft speed and either mainshaft speed or input shaft speed and main section engaged ratio (other than main section neutral), the auxiliary section ratio may be determined. If the ratio across the auxiliary section does not equal the currently selected auxiliary section ratio or any other selectable auxiliary section ratio, this is an indication that the auxiliary section is not engaged.

According to the present invention, if it is determined that a selected range auxiliary section ratio has been commanded into engagement, and that the range auxiliary section is not engaged in the selected ratio or in the other ratio thereof, then the double-acting range clutch is commanded to shift into the other ratio until contact of the other ratio's synchronizer friction surfaces is sensed, and then a shift into the selected range section ratio is reinitiated.

Controlling the range-type automated transmission system according to the above procedure will assure that the synchronizer for the selected range section ratio is properly reset prior to attempted engagement to minimize the possibility of synchronizer hang-up or crash-through. Typically, contact of the other range ratio's synchronizer friction surfaces is sensed by sensing for a predetermined change, or rate of change, in the speed of the mainshaft or input shaft speed. Preferably, if a predetermined number of attempts (such as three) to engage the selected range ratio are not successful, the other range ratio will be engaged and the transmission will then operate in a degraded, fault tolerance mode without further range shifting. If neither range ratio is engageable, the system will be shut down.

Accordingly, it is an object of the present invention to provide an improved not-engaged range section recovery routine for fully or partially automated mechanical transmission systems utilizing range-type compound transmissions.

This and other objects and advantages of the present invention will become apparent from a reading of the detailed description of the preferred embodiment taken in connection with the attached drawings.

BRIEF DESCRIPTION OF THE DRAWINGS

FIG. 1A is a schematic illustration of the shift pattern for the transmission of of FIG. 1.

FIG. 3 is a schematic illustration, in flow chart format, of the present invention.

DESCRIPTION OF THE PREFERRED EMBODIMENT

Certain terminology will be used in the following description for convenience in reference only and will not be limiting. The term "compound transmission" is used to designate a change speed or change gear transmission having a multiple forward speed main transmission section and a multiple-speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Signals indicative of engine speed will include signals (ES) from engine speed sensors, signals (IS) from input shaft speed sensors and signals such as output shaft speed and gear ratio signals which may be used to calculate (ES=IS=OS*GR) and/or estimate engine speed.

Figure 1:
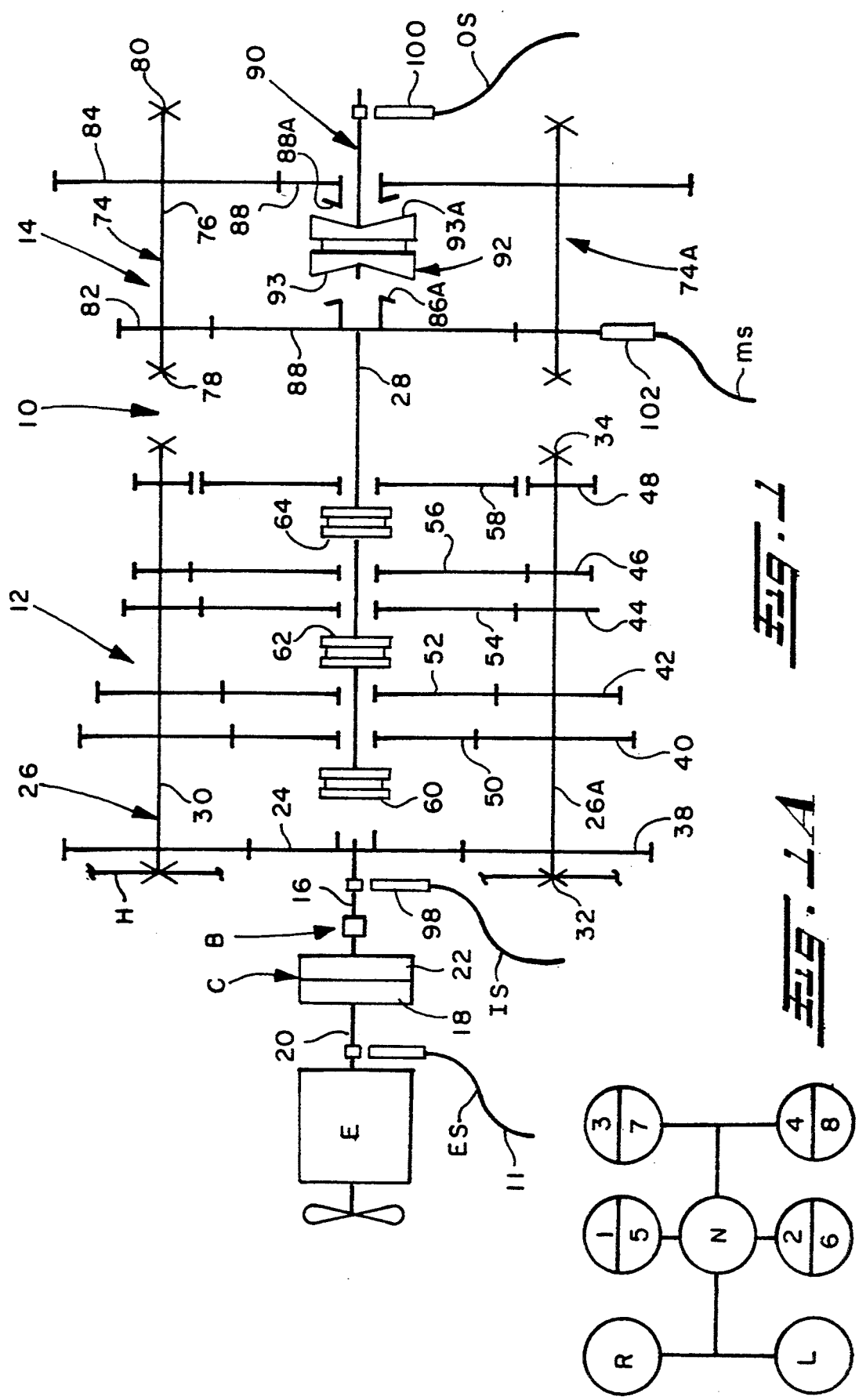
FIG. 1 is a schematic illustration of the vehicular mechanical transmission system partially automated by the system of the present invention.

Referring to FIG. 1, a partially automated range-type compound transmission 10 contolled by the control system/method of the present invention is illustrated. Compound transmission 10 comprises a multiple-speed main transmission section 12 connected in series with a range-type auxiliary section 14. Transmission 10 is housed within a housing H and incudes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and the master clutch C is manually controlled by a clutch pedal (not shown) or automatically controlled by a clutch actuator, or the like. An input shaft brake B, usually operated by overtravel of the clutch pedal, may be provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal (ES)indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. FIG. 1A is a schematic illustration of the shift pattern of transmission 10. Similar transmissions provide 10, 13, 16 or 18 forward speeds, as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position, double-acting synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10. Double-acting synchronized jaw clutches of this type are well known in the prior art, as may be seen by reference to U.S. Pat. Nos. 4,059,178; 4,081,319; 4,252,222; 4,540,074; 4,754,665 and 4,989,706, the disclosures of which are incorporated herein by reference.

Range section actuator 96 may be of the type illustrated in U.S. Pat. Nos. 3,648,546; 4,440,037 and 4,614,126, the disclosures of which are hereby incorporated by reference.

Although the range-type auxiliary section 14 is illustrated as a two-speed section utilizing spur or helical type gearing, it is understood that the present invention is also applicable to range-type transmissions utilizing combined splitter/range-type auxiliary sections and/or utilizing planetary type gearing. Also, any one or more of clutches 60, 62 or 64 may be of the synchronized jaw clutch type and transmission sections 12 and/or 14 may be of the single countershift type.

Figure 2:
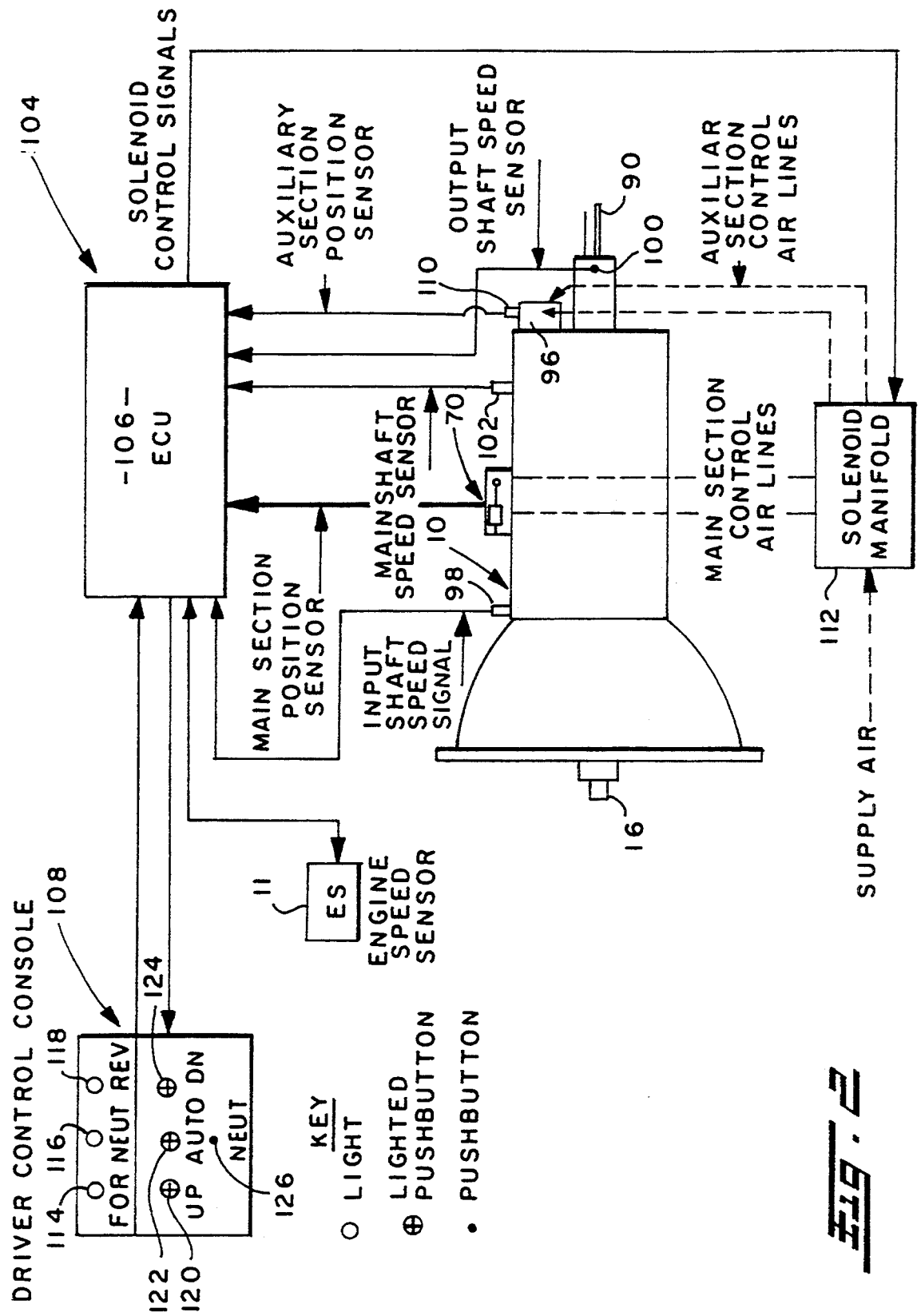
FIG. 2 is a schematic illustration of the semi-automatic shift implementation system for a mechanical transmission system of the present invention.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed (IS) sensor 98, from the output shaft speed (OS) sensor 100, the mainshaft speed (MS) sensor 102 and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e., upshifts or downshifts) or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Figure 2A:
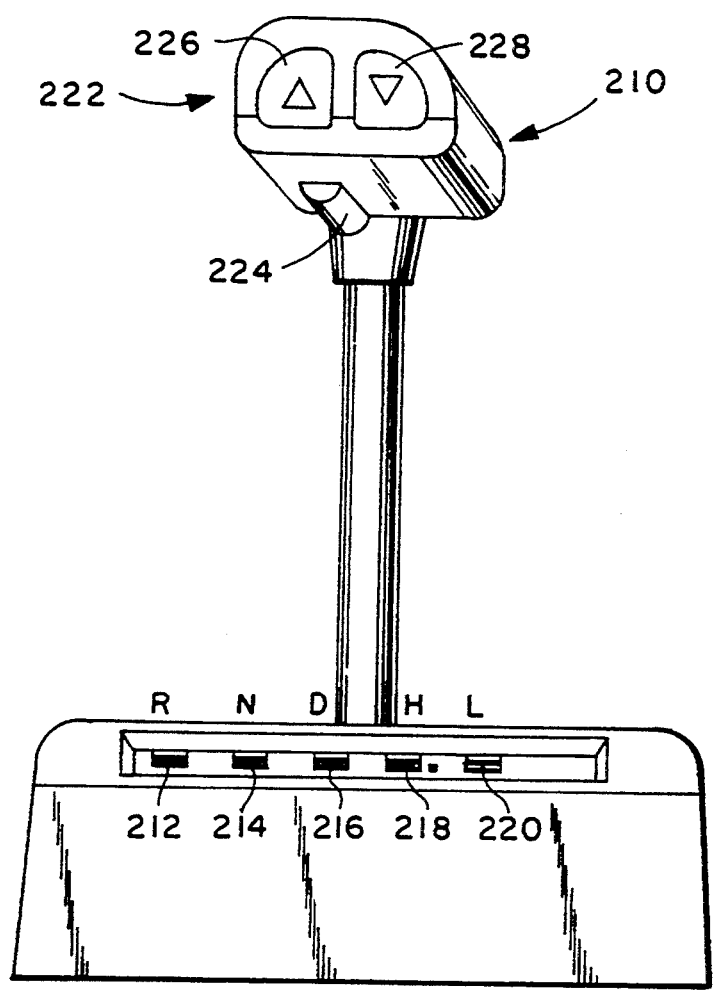
FIG. 2A is an elevational view of an alternate driver control for the transmission system of FIG. 2.

An alternate to the control console 108 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. The function of mode selector 210 is substantially identical to console 108 described above.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the control algorithms, the issuing of command output signals for engagement of a target gear is dependent upon the transmission (i.e., the input shaft) being manually brought to within an acceptable synchronous point. This synchronous point is usually a range of RPMs (error band) centered about an error of zero RPM (i.e., when input shaft speed equals the product of output shaft speed times the numerical value of the target gear ratio, $IS=OS*GR_T$). When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear.

In the automatic preselection mode of operation, selected by use of lighted pushbutton 122, or by moving selector 210 to the "D" position, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode by depression of pushbutton 122.

If the range secton 14 is determined to be not engaged in either the selected range ratio or in the other range ratio, corrective action must be taken. This condition is typically sensed by comparing output shaft speed (OS), as sensed by sensor 100, to either mainshaft speed (MS), as determined by sensor 102, or the product of input shaft speed (IS) times engaged mainsection gear ratio ($GR_{MS}$). If this comparison does not indicate a known auxiliary section gear ratio ($GR_{AS}$), the range section is not engaged.

A non-intended, not-engaged range section condition will typically occur in one of three circumstances, namely synchronizer hang-up during a compound shift, clutch tooth butting during a compound shift or clutch pop-out during severe vehicle operating conditions. Upon sensing an unintended range section not-engaged condition, it is important to provide a procedure for engaging/reengaging the selected range section ratio with a high probability of success and minimized probability of a non-synchronous crash-through engagement. This requires that the relatively rotatably movable members of the synchronizer assembly be properly positioned.

According to the present invention, if an unintended range section not-engaged condition is sensed, the following range section engagement procedure is initiated:

(a) the main transmission section 12 is shifted to or retained in neutral;

(b) then, the double-acting range synchronizer is urged to the position opposite that required for engagement of the selected range section ratio until engagement of the other ratio synchronizer friction surfaces is sensed, usually by sensing a change in mainshaft speed; and (c) then urging the double-acting synchronized jaw clutch assembly to engage the selected range section ratio.

By contacting the friction surfaces associated with the other range ratio, the synchronizer is properly positioned (i.e., set up) for engaging the selected range section ratio. If the above procedure does not result in engagement of the selected range section ratio after a number of attempts, such as three, the opposite range section ratio will be engaged, if possible, and the transmission will be operated in a degraded, fault-tolerant mode wherein range shifts are not attempted.

The range section engagement/reengagement from an unintended, non-engaged range section condition control method/system is schematically illustrated, in flow chart format, in FIG. 3.

Although the present invention has been described with a certain degree of particularity, it is understood that various changes to form and detail may be made without departing from the spirit and the scope of the invention as hereinafter claimed.

I claim:

1. A control system for controlling shifting of a two-speed transmission section (14) comprising a double-acting synchronized jaw clutch assembly (92), including an axially movable two-sided jaw clutch member (93) fixed for rotation with a first shaft (90) and having a first axial position relative to said first shaft for engaging a first selectable ratio (88) and a second axial position relative to said first shaft for engaging a second selectable ratio (86), movement of said axially movable jaw clutch member toward each of said first and second axial positions initially causing engagement of synchronizer friction surfaces (93A) carried by said axially movable jaw clutch member with synchronizer friction surfaces (86A, 88A) carried by second jaw clutch members rotating with a second shaft (28) prior to positive engagement of the engaging first and second jaw clutch members, said system including:

means to sense selection of one of said transmission section ratios;

means for sensing signals indicative of rotational speed of said first and second shafts and determining if either of said selectable ratios is engaged;

means effective, if neither of said selectable ratios is engaged, for causing said axially movable jaw clutch member to move axially toward the axial position thereof associated with engagement of the non-selected ratio;

means for then sensing for engagement of the synchronizer friction surfaces engageable upon axial movement of said axially movable jaw clutch member toward the axial position thereof associated with engagement of the non-selected ratio; and means for, upon sensing engagement of the synchronizer friction surfaces engageable upon axial movement of said axially movable jaw clutch member toward the axial position thereof associated with engagement of the non-selected ratio, causing said axially movable jaw clutch member to move toward the axial position thereof associated with engagement of said selected speed ratio.

2. The system of claim 1 wherein sensing engagement of synchronizer friction surfaces comprises sensing for changes in the rotational speed of one of said shafts and comparing said change to a predetermined reference value.

3. The system of claim 1 wherein said transmission section is a range section (14) of a compound transmission (10), including a multiple speed main section (12) connected in series with said range section.

4. The system of claim 2 wherein said transmission section is a range section of a compound transmission, said compound transmission including a multiple speed main section (12) connected in series with said range section.

5. A control method for controlling shifting of a two-speed transmission section (14) comprising a double-acting synchronized jaw clutch assembly (92), including an axially movable two-sided jaw clutch member (93) fixed for rotation with a first shaft (90) and having a first axial position relative to said first shaft for engaging a first selectable ratio (88) and a second axial position relative to said first shaft for engaging a second selectable ratio (86), movement of said axially movable jaw clutch member toward each of said first and second axial positions initially causing engagement of synchronizer friction surfaces (93A) carried by said axially movable jaw clutch member with synchronizer friction surfaces (86A, 88A) carried by second jaw clutch members rotating with a second shaft (28) prior to positive engagement of the engaging first and second jaw clutch members, said method including:

sensing selection of one of said transmission section ratios;

sensing signals indicative of rotational speed of said first and second shafts and determining if either of said selectable ratios is engaged; and if neither of said selectable ratios is engaged:

(a) causing said axially movable jaw clutch member to move axially toward the axial position thereof associated with engagement of the non-selected ratio;

(b) then sensing for engagement of the synchronizer friction surfaces engageable upon axial movement of said axially movable jaw clutch member toward the axial position thereof associated with engagement of the non-selected ratio; and (c) upon sensing engagement of the synchronizer friction surfaces engageable upon axial movement of said axially movable jaw clutch member toward the axial position thereof associated with engagement of the non-selected ratio, causing said axially movable jaw clutch member to move toward the axial position thereof associated with engagement of said selected speed ratio.

6. The method of claim 5 wherein sensing engagement of synchronizer friction surfaces comprises sensing for changes in the rotational speed of one of said shafts and comparing said change to a predetermined reference value.

7. The method of claim 5 wherein said transmission section is a range section (14) of a compound transmission (10), including a multiple speed main section (12) connected in series with said range section.

8. A control system for controlling shifting of an automated mechanical transmission system, including a two-speed range section (14) of a compound transmission (10), including a multiple-speed main section (12) connected in series with said range section, said range section comprising a double-acting synchronized jaw clutch assembly (92), including an axially movable two-sided jaw clutch member (93) fixed for rotation with a first shaft (90) and having a first axial position relative to said first shaft for engaging a first selectable ratio (88) and a second axial position relative to said first shaft for engaging a second selectable ratio (86), movement of said axially movable jaw clutch member toward each of said first and second axial positions initially causing engagement of synchronizer friction surfaces (93A) carried by said axially movable jaw clutch member with synchronizer friction surfaces. (86A, 88A) carried by second jaw clutch members rotating with a second shaft (28) prior to positive engagement of the engaging first and second jaw clutch members, said automated transmissino system including a central processing unit (106) for receiving input signals and for processing same according to predetermined logic rules to issue command output signals to system actuators, said system including:

means to sense selection of one of said transmission section ratios;

means for sensing signals indicative of rotational speed of said first and second shafts and determining if either of said selectable ratios is engaged;

means effective, if neither of said selectable ratios is engaged, for causing said main transmission section to be shifted to neutral;

means for causing said axially movable jaw clutch member to move axially toward the axial position thereof associated with engagement of the non-selected ratio;

means for then sensing for engagement of the synchronizer friction surfaces engageable upon axial movement of said axially movable jaw clutch member toward the axial position thereof associated with engagement of the non-selected ratio; and means for, upon sensing engagement of the synchronizer friction surfaces engageable upon axial movement of said axially movable jaw clutch member toward the axial position thereof associated with engagement of the non-selected ratio, causing said axially movable jaw clutch member to move toward the axial position thereof associated with engagement of said selected speed ratio.

9. The system of claim 8 wherein, said means for sensing engagement of synchronizer friction surfaces comprises means sensing for changes in the rotational speed of one of said shafts and comparing said change to a predetermined reference value.

* * * * *